United States Patent [19]

Miller

[11] Patent Number: 5,452,403
[45] Date of Patent: Sep. 19, 1995

[54] PROCESS FOR SELECTING OUTPUT LEVELS FOR MULTI-LEVEL HALFTONE IN THE PRESENCE OF AN UNSTABLE DISPLAY DEVICE

[75] Inventor: Rodney L. Miller, Fairport, N.Y.

[73] Assignee: Eastman Kodak Company, Rochester, N.Y.

[21] Appl. No.: 995,841

[22] Filed: Dec. 23, 1992

[51] Int. Cl.$^6$ .............................. G06F 15/66
[52] U.S. Cl. .................... 395/109; 395/113; 364/517
[58] Field of Search ............... 395/117, 113, 109, 107; 364/517, 520, 521; 358/456; 382/54

[56] References Cited

U.S. PATENT DOCUMENTS

| | | | |
|---|---|---|---|
| 3,953,668 | 4/1976 | Judice | 178/6 |
| 4,389,672 | 6/1983 | Bowen et al. | 358/160 |
| 4,547,811 | 10/1985 | Ochi et al. | |
| 4,651,287 | 3/1987 | Tsao | 364/519 |
| 4,692,879 | 9/1987 | Ikuta | 364/518 |
| 4,792,979 | 12/1988 | Nomura et al. | 382/54 |
| 4,920,501 | 4/1990 | Sullivan et al. | |
| 4,924,322 | 5/1990 | Kurosawa et al. | |
| 4,951,228 | 8/1990 | Hirawa et al. | 364/520 |
| 4,962,542 | 10/1990 | Klees | |
| 5,003,496 | 3/1991 | Hunt, Jr. et al. | 364/521 |
| 5,014,333 | 5/1991 | Miller et al. | |
| 5,051,844 | 9/1991 | Sullivan | |
| 5,070,413 | 12/1991 | Sullivan et al. | |
| 5,111,310 | 5/1992 | Parker et al. | |
| 5,146,548 | 9/1992 | Bijnaste | 395/117 |
| 5,260,806 | 11/1993 | Samworth | 358/456 |

OTHER PUBLICATIONS

Computer Physics Communications, vol. 52, 1989, Amsterdam, NL, pp. 427–442, "Polyfit–A Package For Polynomial Fitting".

*Primary Examiner*—Mark R. Powell
*Assistant Examiner*—Steven P. Sax
*Attorney, Agent, or Firm*—Peyton C. Watkins

[57] ABSTRACT

A process for selecting output levels for multi-level halftones optimizes the stability of an output device, even though the system contains unstable components. First, a function which quantifies undesirable mean level image artifacts for the unstable display device is defined, to stabilize the tone transfer curve of the unstable device. Then density levels are chosen to minimize the function and optimize stability of the output device.

6 Claims, 6 Drawing Sheets

PROCESS FOR SELECTING OUTPUT LEVELS FOR MULTI-LEVEL HALFTONE IN THE PRESENCE OF AN UNSTABLE DISPLAY DEVICE

TECHNICAL FIELD

The present invention is directed to the field of multi-level halftoning and, more particularly, to a process for choosing multiple output density levels to be utilized by multi-level halftoning in the presence of an unstable output device.

BACKGROUND ART

For years, many types of display devices have essentially been used in a binary mode, capable of providing only two density levels at each pixel location. These technologies were combined with various forms of bi-tonal halftoning to provide a simulated continuous tone reproduction capability. In bi-tonal halftoning, the appearance of intermediate shades of gray are created by a spatial modulation of black and white.

Recent improvements and advances in display technology have resulted in the availability of display devices with the capability of providing more than two levels of density at each pixel location. A variety of halftone algorithms have been developed which utilize the additional levels. This practice, known as multi-level halftoning, creates the appearance of intermediate tones by the spatial modulation of more than two tones, i.e., black, white, and one or more shades of gray.

In the existing art, U.S. Pat. No. 4,547,811 addresses multi-level halftoning techniques. The '811 patent relates to a method and apparatus for gray level processing, wherein images with less gray levels and many gray levels are reproduced in high quality. Additionally, U.S. Pat. No. 4,792,979 to Nomura et al relates to a method and apparatus for correcting the gradation of an image represented by image data. Although the prior art addresses the problem of density levels, i.e., minimizing system artifacts such as contouring and noise, the existing art does not address unstable display devices.

It is seen then that it would be desirable to have a process for optimizing an unstable output device.

SUMMARY OF THE INVENTION

The present invention is a process for selecting output levels for multi-level halftones in the presence of an unstable device. More specifically, the present invention is a process for choosing multiple output density levels to be used by a multi-level halftoning algorithm in the presence of an unstable device. This process optimizes the performance and capabilities of a given multi-level half-tone algorithm by specifying output levels whose instability has a minimal impact on image quality.

In accordance with one aspect of the present invention, a process for selecting output levels for multi-level halftones in the presence of an unstable output device comprises the steps of: defining a function which quantifies undesirable mean level image artifacts for an unstable display device and then choosing density levels which minimize the function.

Accordingly, it is an object of the present invention to provide a process for selecting output levels for multi-level halftoning which can optimize the performance and capabilities of a given multi-level halftone algorithm. Other objects and advantages of the invention will be apparent from the following description, the accompanying drawings and the appended claims.

DETAILED DESCRIPTION OF THE PREFERRED EMBODIMENTS

The present invention relates to a process for choosing multiple output density levels to be utilized by a multi-level halftoning algorithm in the presence of an unstable display device. Multi-level halftoning creates the appearance of intermediate tones by the spatial modulation of more than two tones, i.e., black, white, and one or more shades of gray.

Figure 1:
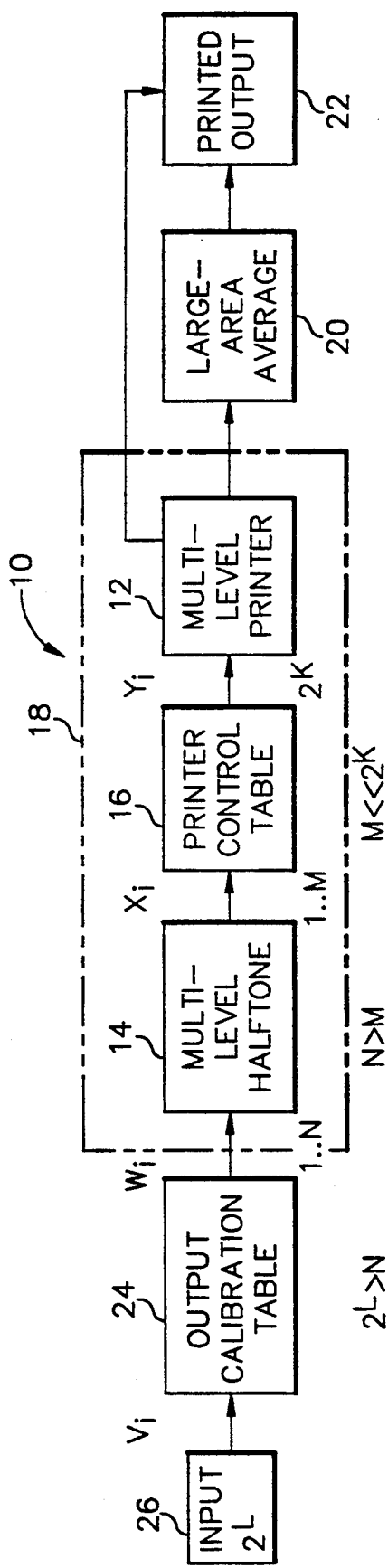
FIG. 1 is block diagram of a typical architecture employing a multi-level printer.

Referring to the drawings, FIG. 1 illustrates an N-level display device or system 10 employing a multi-level halftoning printer 12. The multi-level printer 12, a multi-level halftone 14, and a printer control table 16 are shown as an output device 18 capable of printing N unique large-area densities. The output of the printer 12 must be processed through a large-area average box 20, indicative of integration over a large area, to determine the average density for evaluating an actual system tone transfer. The output of the printer 12 also provides a printed output 22. Typically, a calibration table, such as output calibration table 24, precedes the N-level output device 18 in order to achieve the target system tone transfer function between input image data 26 and the average density printed output 22.

In order to fully utilize all N output levels of the N-level display device 10, the dynamic resolution of the input 26 is usually greater than N, i.e., $2^L > N$. Following the output calibration table 24, the multi-level halftone algorithm 14 creates a spatially modulated M-level output signal where $N > M$. Each of the M levels is translated into a printer control signal $Y_i$, through the printer control table 16. Typically, $y_i$ is K bits wide where $M << 2^K$. Ideally, the display device 10 prints each pixel independently of those around it with a density that corresponds to the pixel code value $Y_i$.

Figure 2:
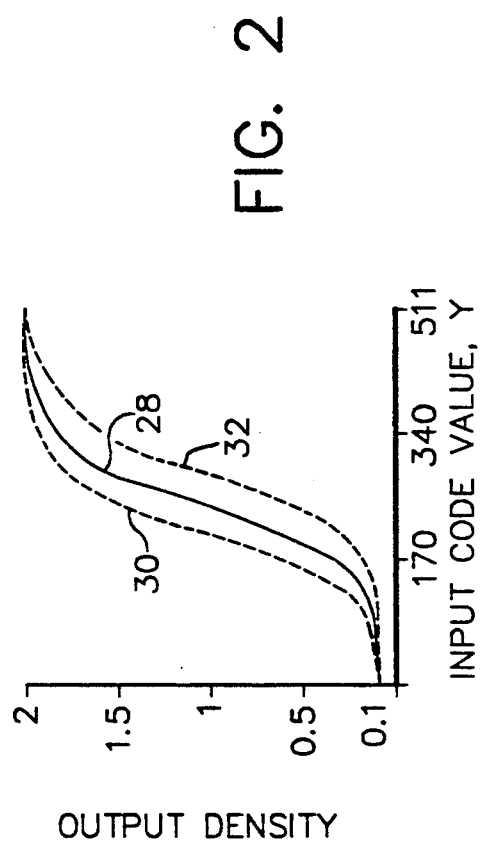
FIG. 2 is a graphical illustration of a printer tone transfer function for the multi-level printer in FIG. 1.

In the prior art, the printer control table 16 is built to minimize system artifacts such as contouring and noise. However, this approach assumes that all the density levels provided by the display device will be reasonably stable. Unfortunately, regions of the display device's density tone scale will often fluctuate due to factors such as component wear and changing environmental conditions. For example, as shown in FIG. 2, assuming K=9, a printer tone transfer function of the multi-level printer 12 may consist of a typical s-shape, as indicated by solid curve 28. The printer tone transfer function 28 is measured from the input of the printer 12 to the output of the printer 12, as the printer 12 represents the unstable component in the system 10. Over the life of the printer 12, the printer tone transfer function may fluctuate to either of the extremes represented by the dotted lines 30 and 32.

Figure 3:
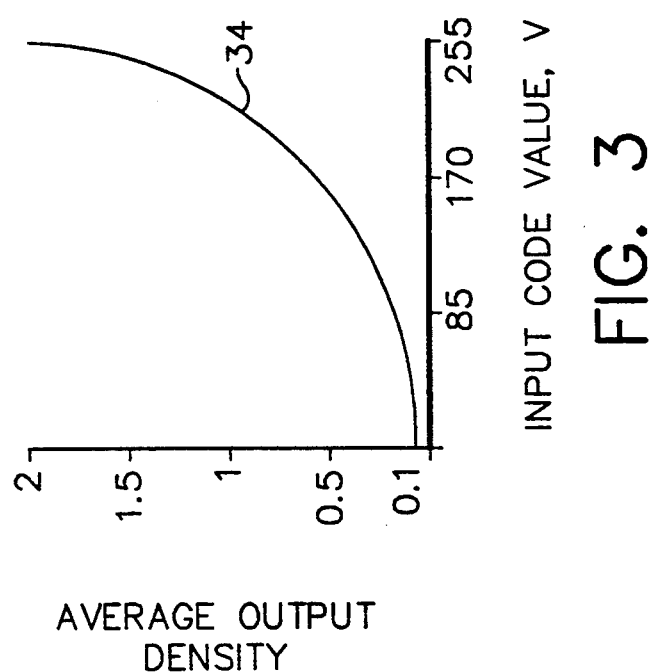
FIG. 3 is a graphical illustration of a target system tone transfer function from the input of the output calibration table to the output of the large-area average of FIG. 1.
Figure 9:
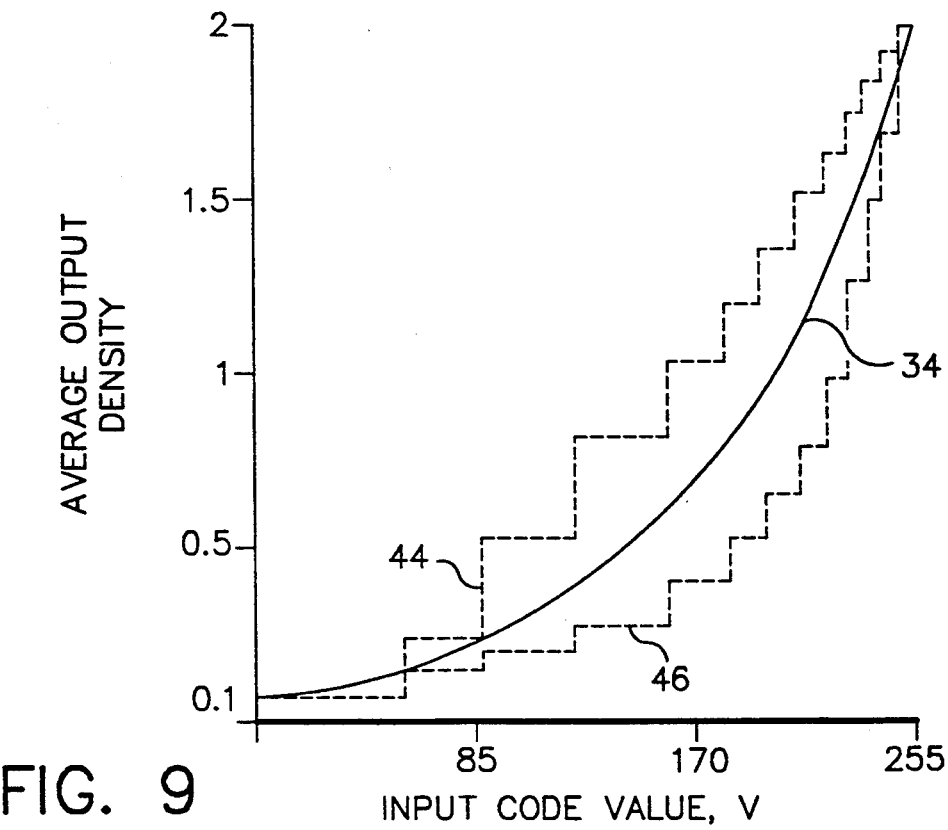
FIG. 9 is a graphical illustration of the target system tone transfer of FIG. 3 and actual system tone transfers for the printer of FIG. 1 operating at extremes.

Consequently, to carry out the process of the present invention, a function is defined which quantifies undesirable mean level image artifacts for the unstable display device 10. One means for defining the function involves the identification of a target system tone transfer curve which specifies the average output density for each input level as processed by the system 10 of FIG. 1. Assuming L to be equal to eight, where L is usually a given system parameter, a target system tone transfer curve 34 will usually be non-linear, as illustrated in FIG. 3. Even though the input code value v along the horizontal axis in FIG. 3 is a discrete quantity, the curve 34 is shown as a continuous curve for the sake of simplicity, which extends out to the output of the large-area average of box 20 in FIG. 1. Due to display device instabilities, an actual system tone transfer will vary within some envelope, as indicated in FIG. 9. The actual shape of the envelope will depend on the nature of the multi-level halftone algorithm 14, the physical characteristics of the display substrate and display toners or inks, and the entries in the printer control table 16 which are to be optimized. This is accomplished by defining the function that is to be minimized, as described in more detail later.

For example, the nature of the multi-level halftone algorithm 14 may be to create a periodic one-dimensional micro-structure using halftone cells that are one pixel wide by four pixels long. If the output of the halftone algorithm is quantized to four levels, i.e., M=4, then for typical applications, a total of thirteen mean levels can be rendered.

Figure 4:
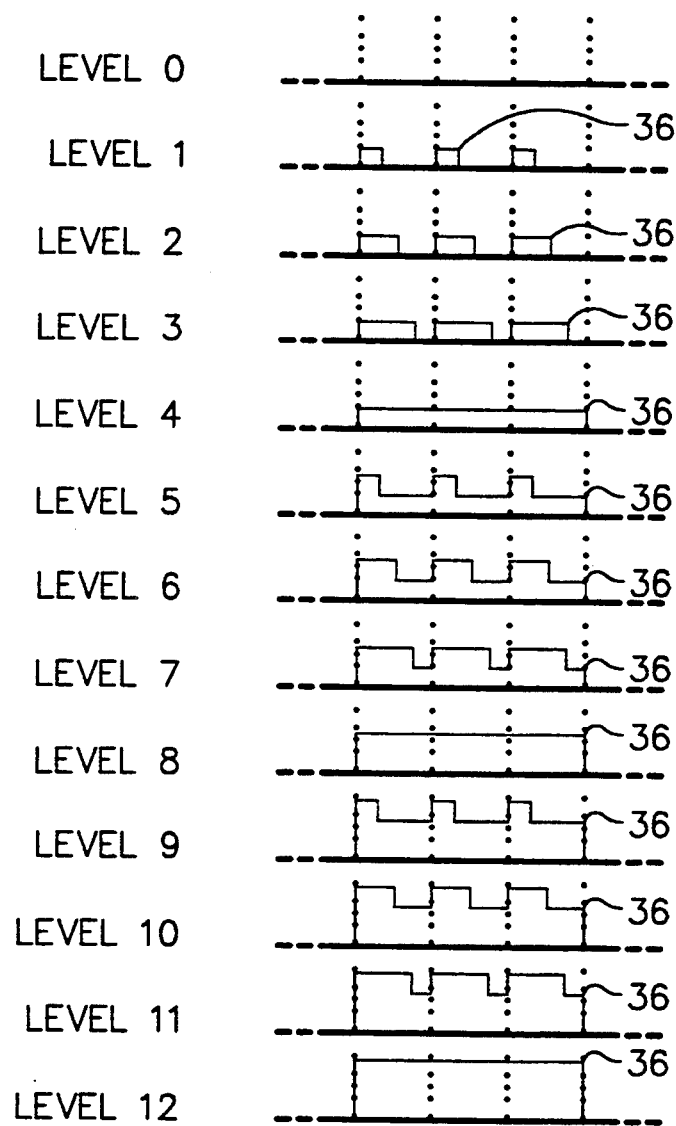
FIGS. 4 and 5 are level rendering approaches with minimum and maximum modulation, respectively, for the output of the multi-level halftone of FIG. 1.
Figure 5:
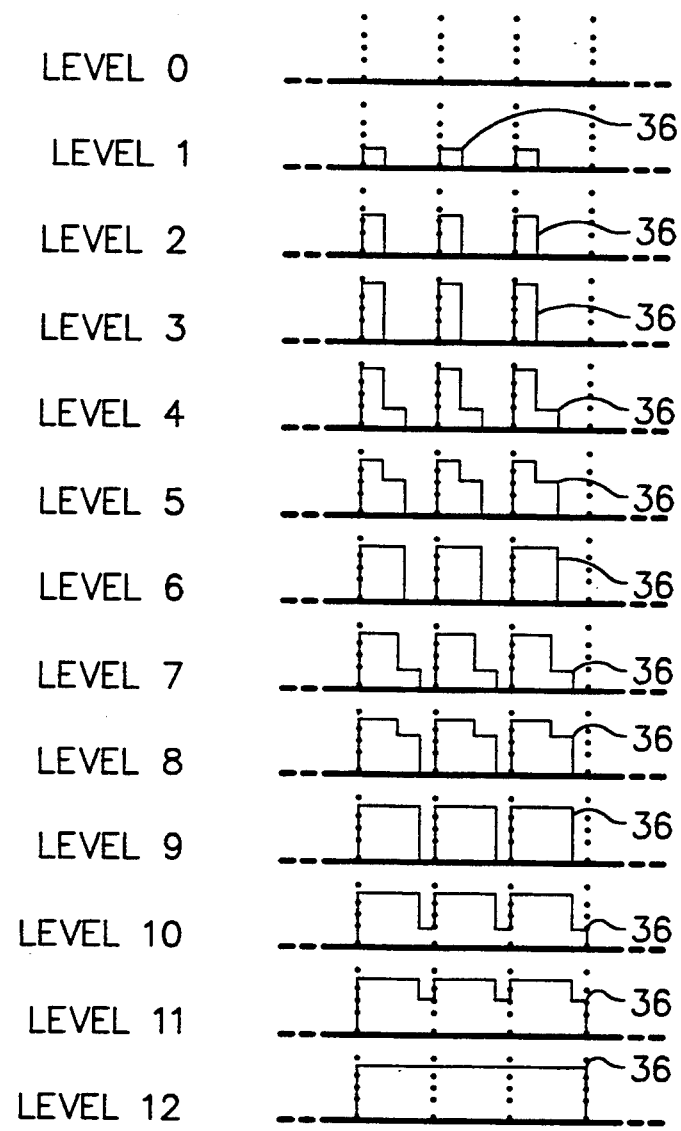

Two approaches to rendering the thirteen levels are shown in FIGS. 4 and 5. FIG. 4 illustrates rendering the thirteen levels, form Level 0 to Level 12, with a minimum amount of modulation, and FIG. 5 illustrates rendering the thirteen levels, form Level 0 to Level 12, with a maximum amount of modulation. FIGS. 4 and 5 shown cross-sections of a segment of a waveform 36, where the waveform is equal to zero at Level 0 and equal to one at Level 12. Hence, FIGS. 4 and 5 show two extremes for going from a waveform of zero to a waveform of one. From FIGS. 4 and 5, it is obvious that the amount of modulation affects which of the M available density levels is used to synthesize the N output levels, thereby impacting the amount of variation that a tonally unstable pixel may have on any one of the N average output levels.

The physical characteristics of the hardcopy display device will also affect the shape of the instability envelope, due to the interaction of the modulated multi-level halftone image with the paper and toners. Given the density of each pixel, the first-order approximation of the average density over some region R is given by $$D_{ave} = -\log(1/R \ \Sigma^R_{i=1} 10^{-d_i}) \quad (1)$$

where $D_{ave}$ is the average density of the region and $d_i$ is the density of the ith pixel in the region. Equation (1) represents computing the average reflectance or transmittance and then taking the log of the average. However, an alternate form, $$D_{ave} = 1/R \ \Sigma^R_{i=1} d_i \quad (2)$$

may be more accurate due to second-order effects such as dot-growth, the paper spread function and multiple internal reflection. The actual average density for a given display technology will usually be bounded by the two extremes given in Equations (1) and (2). In a preferred embodiment of the present invention, the large-area average of box 20 in FIG. 1 is either measured or predicted, if possible, by models such as Equations (1) or (2).

It is assumed that for a system with M levels output from the multi-level halftone algorithm 14, one level will be placed at the $D_{min}$ of the display device and one level will be placed at the $D_{max}$. For example, from FIG. 1 the first entry in the printer control table 16 will be zero and the last entry will be $2^K-1$. As a result, for a M-level system, there are M minus two entries which must be specified in the printer control table 16. The combination of a multi-level halftone algorithm 14, the printer control table 16, the printer tone transfer curve 28, and a method for calculating large-area densities to achieve the printed output 22 from the large-area average of box 20 defines the density out for each of the N code values input into the N-level display device 10.

For example, it can be assumed that N=13 and M=4, using the low modulation rendering approach of FIG. 4, and that the printer control table 16 is constructed such that the four density levels are evenly distributed from $D_{min}$ to $D_{max}$. Table 1 below, then, lists the entries for the printer control table 16 as well as the associated densities, assuming the printer tone transfer curve 28 of FIG. 2.

| X | Y | Nominal Density | Variation 30 Density | Variation 32 Density |
| --- | --- | --- | --- | --- |
| 1 | 0 | 0.100 | 0.100 | 0.100 |
| 2 | 224 | 0.733 | 1.077 | 0.458 |
| 3 | 286 | 1.366 | 1.635 | 1.012 |
| 4 | 511 | 2.000 | 2.000 | 2.000 |

Figure 6:
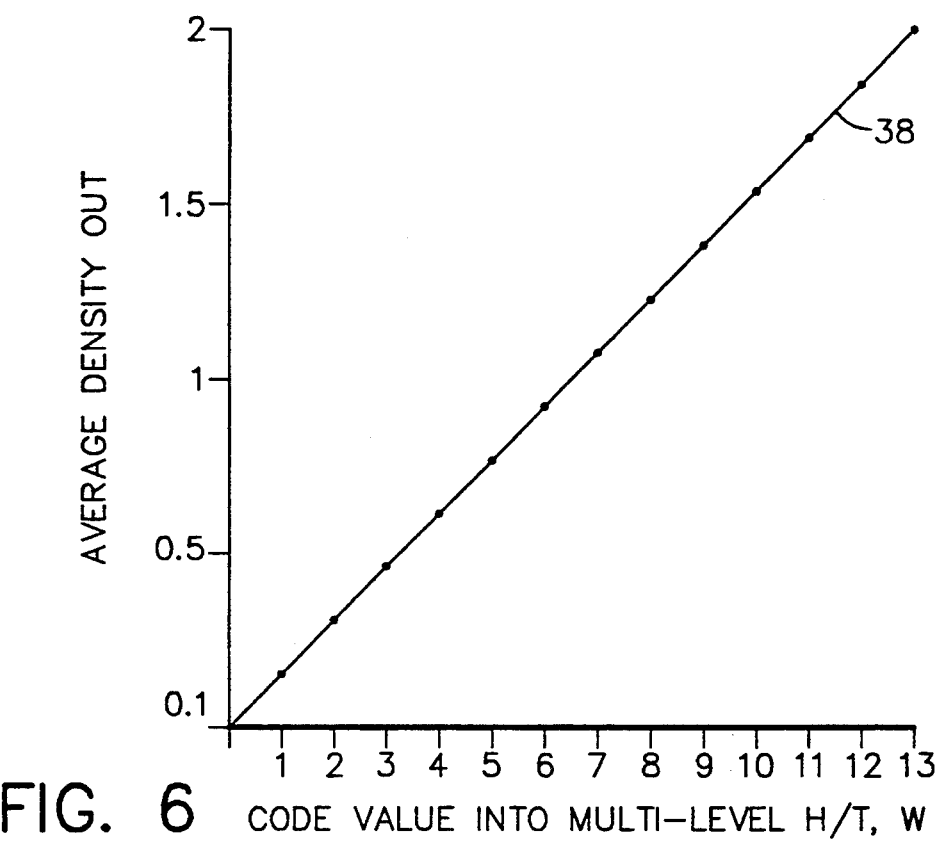
FIG. 6 is a tone transfer function for the thirteen available halftone levels rendered in FIGS. 4 and 5.
Figure 7:
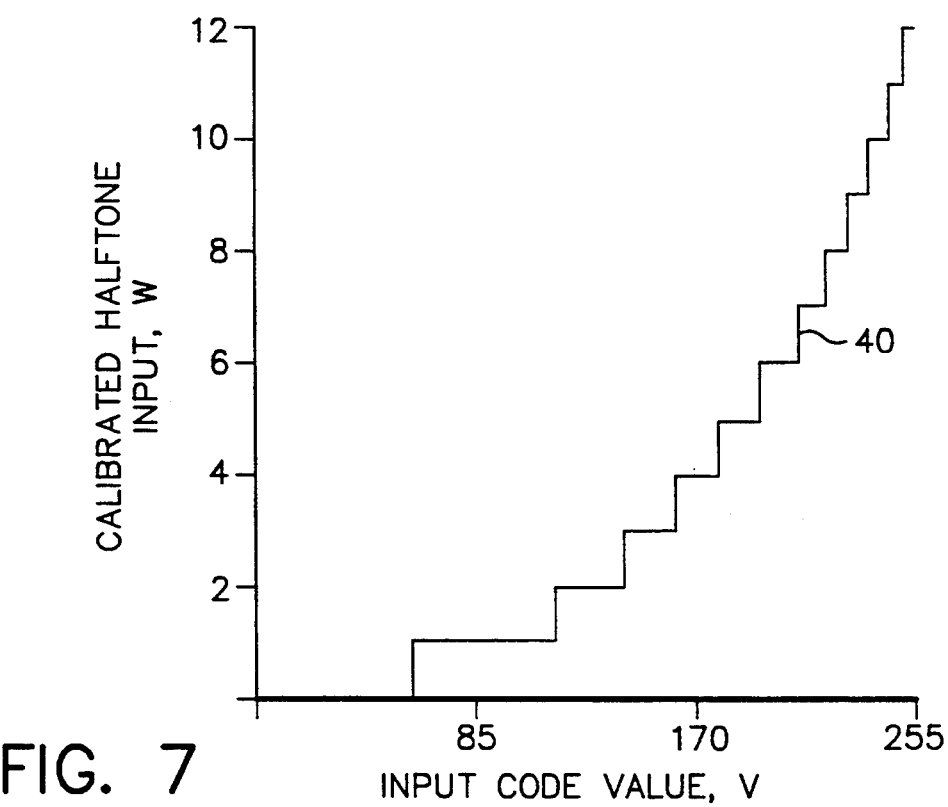
FIG. 7 is a graphical illustration of the output calibration table of FIG. 1.
Figure 8:
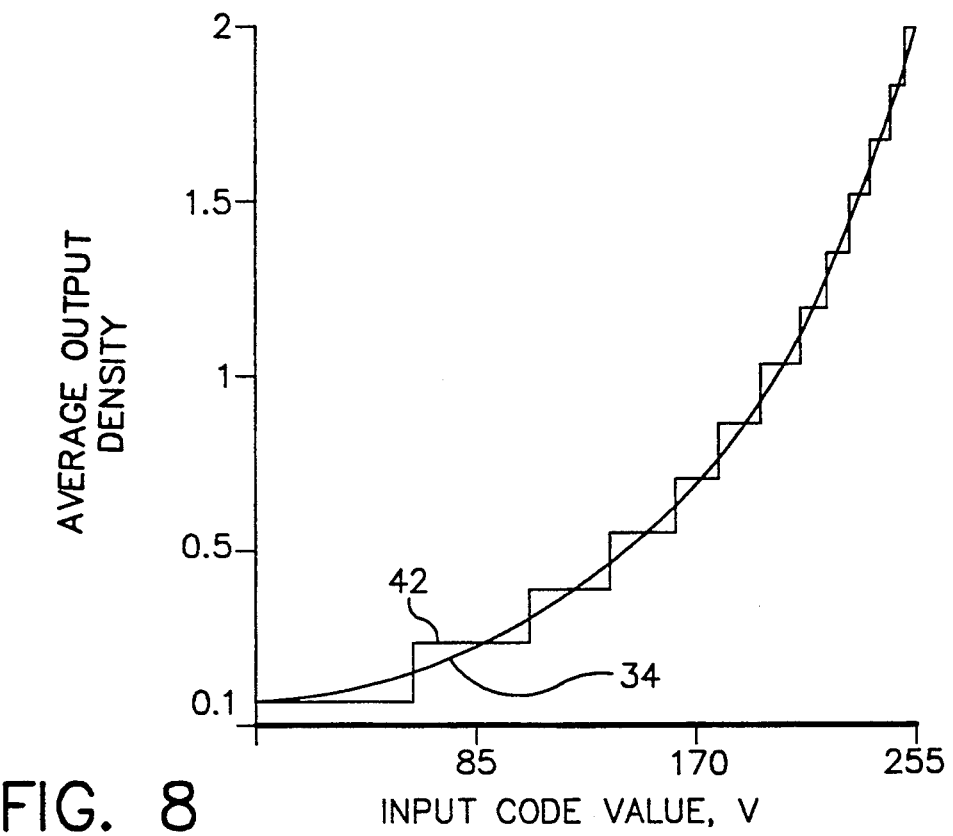
FIG. 8 is a graphical illustration of a nominal system tone transfer function associated with the multi-level printer of FIG. 1 operating at a nominal setting superimposed on the target system tone transfer function of FIG. 3.

Finally, assuming the large-area average box 20 is given by the simplified expression of Equation (2), this leads to the result illustrated in FIG. 6, where the average output density levels are linearly related to the code value, as indicated by curve 38 created by the thirteen graphed halftone levels. This result can be used in conjunction with the target output tone transfer curve 34 illustrated in FIG. 3, to specify an appropriate output calibration table 24 shown by step curve 40 in FIG. 7. This output calibration table 24 as depicted by step curve 40 in FIG. 7, combined with the rest of the specified system, leads to a nominal system tone transfer curve 42 depicted in FIG. 8, with the target system tone transfer curve 34 overlaid for purposes of comparison. The system described herein can produce thirteen unique levels, resulting in the nominal system tone transfer curve 42. The nominal system tone transfer curve 42 depicts the operation of the system 10 with the printer 12 operating at its nominal setting.

When the output calibration table is combined with the rest of the specified system, except that variation extremes 30 and 32 of the printer tone transfer are used instead of the printer tone transfer function indicated by the solid curve 28, which are also listed in Table 1, then the actual system tone transfer curve may be anywhere within the envelope depicted in FIG. 9. Dotted step curves 44 and 46 indicate the actual system tone transfer curves representative of the printer 12 operating at its extremes. The target tone transfer curve 28 is overlaid thereon for purposes of comparison.

In a preferred embodiment of the present invention, it is desired to simultaneously minimize the difference between the target system tone transfer curve 34 and both extremes 44 and 46 of the actual system tone transfer curve. This objective can be embodied in the following objective function of Equation (3), where the objective function to be determined is that function which is to be minimized:

$$\text{function} = \sum_{i=0}^{2L-1} ((T(v_i) - A_A(v_i))^2 + (T(v_i) - A_B(v_i))^2) \quad (3)$$

where $v_i$ is the input into the halftone process, $T(v_i)$ is the target system tone transfer 34 of FIG. 3, $A_A(v_i)$ is the actual system tone transfer assuming that the printer 12 is operating at variation extreme 44 of FIG. 9, and $A_B(v_i)$ is the actual system tone transfer assuming that the printer 12 is operating at variation extreme 46 of FIG. 9.

One procedure for defining the function which quantifies undesirable mean level image artifacts for the unstable display device is as follows. First, the output calibration table 24 is specified so that when it is cascaded with the multi-level halftone algorithm 14, the printer control table 16, the multi-level printer 12 operating at its nominal setting, and the large-area average of box 20, there is minimum squared-error between the nominal system tone transfer and the target system tone transfer. Second, the output calibration table 24 as determined in the first step above is cascaded with the multi-level halftone algorithm 14, the printer control table 16, variation extreme 44 of the multi-level printer 12, and the large-area average of box 20, to specify $A_A(v_i)$, the actual system tone transfer when the printer 12 is operating at variation extreme 44. Third, the output calibration table 24 as determined in the first step above is cascaded with the multi-level halftone algorithm 14, the printer control table 16, variation extreme 46 of the multi-level printer 12, and the large-area average of box 20, to specify $A_B(v_i)$, the actual system tone transfer when the printer 12 is operating at variation extreme 46. Finally, the objective specified in Equation (3) is calculated, using the target system tone transfer 34, $A_A(v_i)$, and $A_B(v_i)$.

This particular method for minimizing the objective function is described for purposes of illustration only, and is not to be considered as limiting the scope of the invention. As will be obvious to those skilled in the art, any method for minimizing the objective function is included within the scope of this invention.

The present invention provides for a process of choosing multiple output density levels to be utilized by a multi-level halftoning algorithm in the presence of an unstable output device. The process involves defining a function which quantifies the undesirable image artifacts. The process is carried out by choosing density levels which minimize the function. The result will depend on the specific multi-level halftone algorithm used, the micro and macro characteristics of the display device, and the nature of the display device instability.

Industrial Applicability and Advantages

The present invention is useful in the field of multi-level halftoning and has the advantage of optimizing the performance of an unstable display device. The optimization process involves the selection of output levels for multi-level halftones in the presence of an unstable display device. The process has the advantage of optimizing performance and capabilities of a given multi-level halftone algorithm by specifying the output levels whose instability has a minimal impact on image quality. Consequently, the actual system tone transfer of a printing device is optimally stabilized and matched to a target system tone transfer even though the system contains unstable components. It is a further advantage that this is accomplished without adding additional components to the system or putting additional performance constraints on the unstable components.

Having described the invention in detail and by reference to the preferred embodiment thereof, it will be apparent that other modifications and variations are possible without departing from the scope of the invention defined in the appended claims.

What is claimed is:

1. A process for selecting output levels for multi-level halftones in the presence of an unstable output device having an actual system tone transfer, the process comprising the steps of:
   defining a function which quantifies undesirable mean level image artifacts for an unstable system;
   using a multi-level halftoning process "identifying a target system tone transfer curve which specifies average output density for each input level which represents an image in more than two levels; and
   specifying density levels for each of the levels output by the multi-level halftoning process by a look-up table which minimizes the function to optimize stability of the output system device.

2. A process for selecting output levels for multi-level halftones as claimed in claim 1 wherein the step of defining a function comprises the step of stabilizing the actual system tone transfer.

3. A process for selecting output levels for multi-level halftones as claimed in claim 1 wherein the step of defining a function comprises the steps of:
   minimizing squared-error between a nominal system tone transfer of the unstable output device and the target system tone transfer;
   specifying a first actual system tone transfer when the unstable display device is operating at a first variation extreme;
   specifying a second actual system tone transfer when the unstable display device is operating at a second variation extreme; and
   defining the function using the target system tone transfer, the first actual system tone transfer, and the second actual system tone transfer.

4. A process for selecting output levels for multi-level halftones in the presence of an unstable output device, the process comprising the steps of:
   minimizing squared-error between a nominal system tone transfer of the unstable output device and a target system tone transfer;
   specifying a first actual system tone transfer when the unstable display device is operating at a first variation extreme;

specifying a second actual system tone transfer when the unstable display device is operating at a second variation extreme;

defining a function which quantifies undesirable mean level image artifacts for an unstable system using the target system tone transfer, the first actual system tone transfer, and the second actual system tone transfer;

using a multi-level halftoning process which represents an image in more than two levels; and specifying density levels for each of the levels output by the multi-level halftoning process by a look-up table which minimizes the function to optimize stability of the output system device.

5. A process for selecting output levels for multi-level halftones as claimed in claim 4 further comprising the step of matching the first and second actual system tone transfers to the target system tone transfer to optimize stability of the output device.

6. A process for selecting output levels for multi-level halftones as claimed in claim 5 wherein the step of matching comprises the step of simultaneously minimizing the difference between the target system tone transfer and the first and second actual system tone transfers.

* * * * *